July 1, 1941.  G. C. PAPENDICK  2,247,693
MACHINE FOR FRACTIONATING AND SLICING BREAD LOAVES
Filed Nov. 25, 1938  3 Sheets-Sheet 1
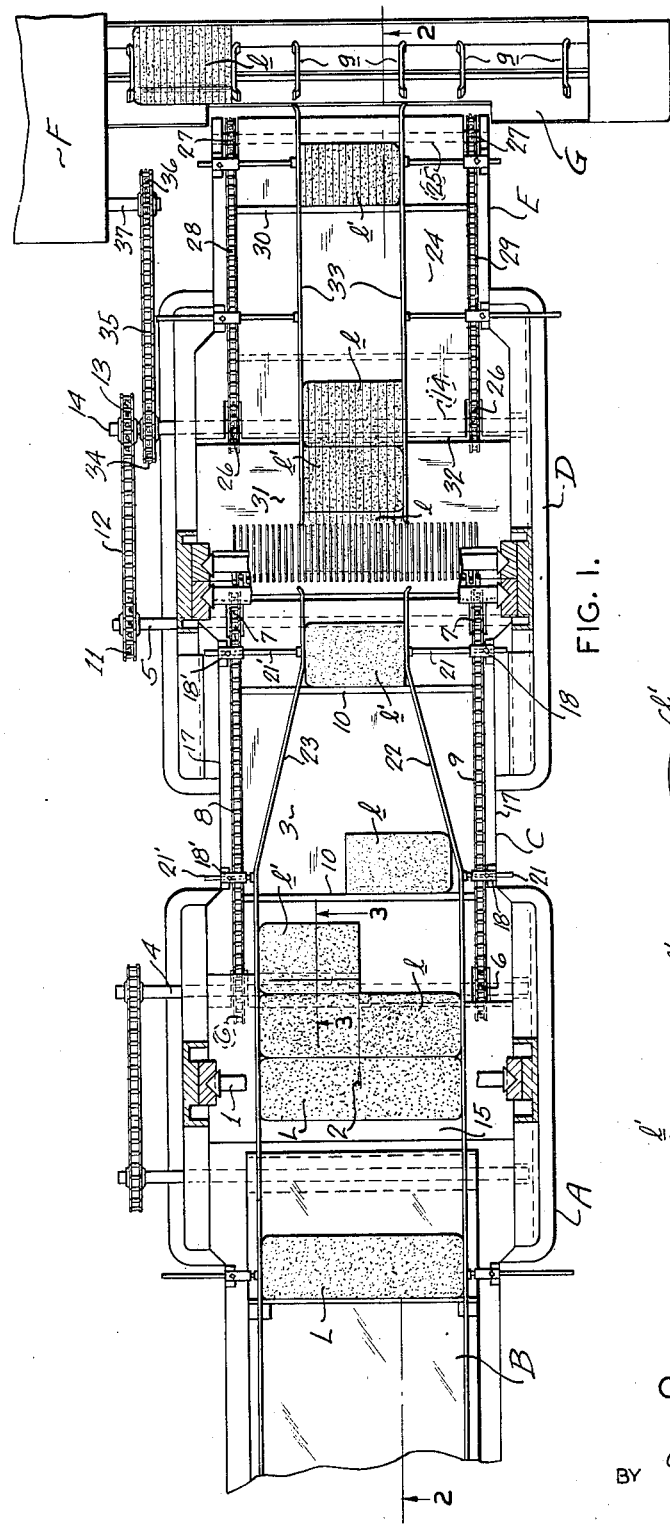
INVENTOR
GUSTAV C. PAPENDICK
BY Ralph Kalish
ATTORNEY

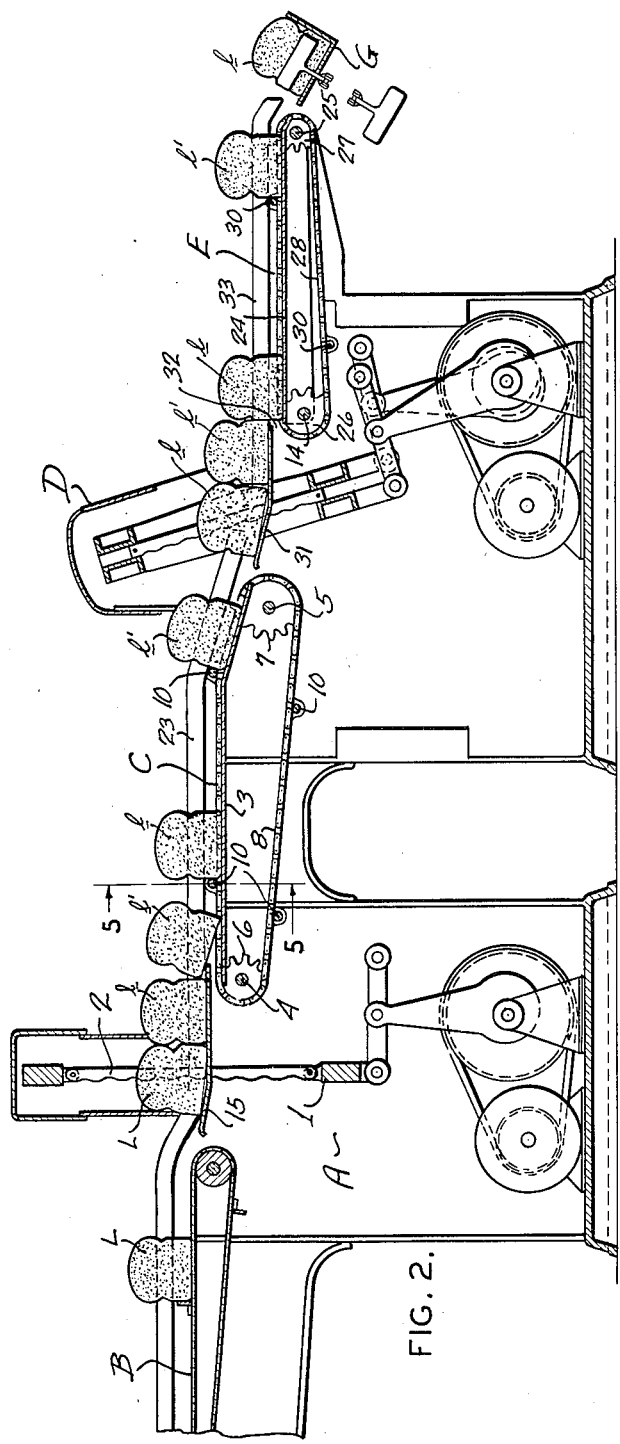

July 1, 1941.  G. C. PAPENDICK  2,247,693
MACHINE FOR FRACTIONATING AND SLICING BREAD LOAVES
Filed Nov. 25, 1938  3 Sheets-Sheet 3

INVENTOR
GUSTAV C. PAPENDICK
BY Ralph Kalish
ATTORNEY

Patented July 1, 1941

2,247,693

UNITED STATES PATENT OFFICE 2,247,693

MACHINE FOR FRACTIONATING AND SLICING BREAD LOAVES

Gustav C. Papendick, University City, Mo.; Elizabeth Papendick executrix of Gustav C. Papendick, deceased, assignor to Papendick, Inc., St. Louis, Mo., a corporation of Missouri Application November 25, 1938, Serial No. 242,431

17 Claims. (Cl. 146—153)

This invention relates in general to certain new and useful improvements in means for fractionating baked bread-loaves, and has for its primary objects not only the provision of means for achieving the stated purposes in a simple, convenient, and economical manner, but also the provision of means which will automatically subdivide bread-loaves into a plurality of fractions in a simple, speedy, and efficient manner without materially adding to the production cost of the bread-loaves, which will fractionate or sub-divide the bread-loaves at high speed in timed relation to the other bread production processes, which will provide the consumer trade with fractionated or sub-divided bread-loaves having improved qualities of taste and freshness, and which may accordingly be wrapped or packaged so as to permit direct inspection of the interior of the bread being purchased.

And with the above and other objects in view, my invention resides in the novel features of form, construction, arrangement, and combination of the several parts presently described and pointed out in the claims.

In the accompanying drawings (3 sheets)—

Figure 1 is a top plan view of a sliced loaf fractionating machine constructed in accordance with and embodying my present invention;

Figure 2 is a vertical sectional view of the loaf fractionating machine, taken approximately along the line 2—2, Figure 1;

Figures 3 and 4 are fragmentary sectional views of the delivery plate of my invention, taken along the line 3—3, Figure 1, and illustrating the stages of loaf fractionating operation thereof;

Figure 5 is a fragmentary transverse sectional view of the machine, taken approximately along the line 5—5, Figure 2;

Figure 6 is a fragmentary perspective view of the primary slicing mechanism of my invention.

Figure 7:
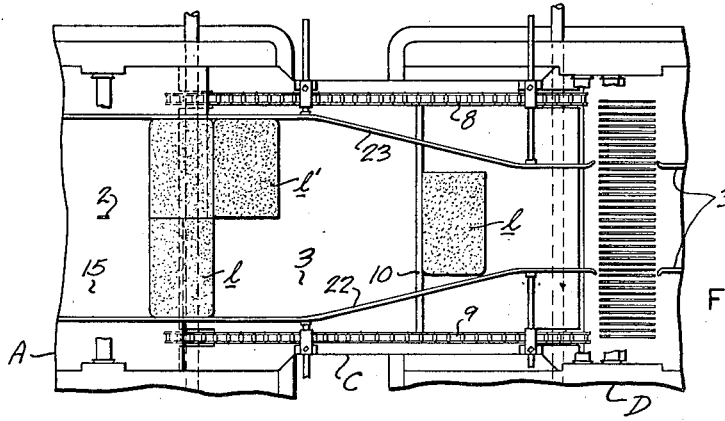
Figures 7, 8, and 9 are diagrammatic views of the intermediate conveyer, illustrating the various stages of loaf fractionating operation.

Referring now in more detail and by reference characters to the drawings, which illustrate a preferred embodiment of my invention, A designates a primary bread-loaf slicing machine preferably of the high speed reciprocating knife type having a single motor driven knife frame 1 provided preferably with one centrally positioned knife blade 2. Operably mounted on the slicing machine A and extending rearwardly therefrom, is a suitable type of loaf-feeding conveyer B preferably, though not necessarily, of the chain-driven flight type.

Extending outwardly from the discharge side of the slicing mechanism A, is an intermediate conveyer C, also of the chain-driven flight type, and including a substantially horizontal table 3 having an idle shaft 4 and a drive shaft 5 operatively journaled in the side frames of the slicing machine A and provided with peripherally aligned pairs of sprockets 6, 7, over which are trained drive chains 8, 9, equipped with a plurality of spaced flight rods 10. The drive shaft 5 is further provided at its extended end with a sprocket 11 connected by a suitable sprocket chain 12 to the sprocket 13 and drive shaft 14 of the secondary slicing machine D for synchronous operation therewith and for movement at a substantially greater rate of speed than the feed conveyer B, as best seen in Figure 1. The secondary slicing machine D is also of the reciprocating knife type similar in all respects to the primary slicer A except that it is equipped with two knife-frames having a multiplicity of knives or blades, all as more fully shown and described in my co-pending applications Serial Nos. 242,430 and 242,432, filed November 25, 1938.

The primary slicing machine A is further provided with a delivery plate 15 extending horizontally forwardly on the discharge side thereof for a distance approximately equal to the width of a bread-loaf and being provided for half of its width with an outwardly projecting step 16 in the provision of a step plate of the character more specifically described in my co-pending application, Serial No. 242,430, filed November 25, 1938. The delivery plate 15 is furthermore spaced slightly upwardly from the upper face of the intermediate conveyer table 3 for permitting the flight rods 10 to move upwardly from beneath the table 3 and forwardly into loaf engagement.

Rigidly mounted on the upwardly presented faces of each of the opposed parallel side frame extensions 17, are axially aligned pairs of upstanding brackets 18, 18', each having a transversely extending horizontal bore 19 and being provided in its side wall with a suitably threaded set screw 20. Shiftably mounted in each of the brackets 18, 18', are axially aligned pairs of guide-supporting rods 21, 21', held firmly in any adjusted position by means of the set screws 20.

Welded or otherwise rigidly mounted on, and extending longitudinally between, the ends of the guide-supporting rods 21, 21', of each side frame extension 17, are opposed side guide members 22, 23, spaced substantially upwardly from the upper face of the transfer conveyer table 3 to allow the flight bars 10 to pass freely thereunder. The guide members 22, 23, at one end terminate adjacent the discharge side of the primary slicing machine A and are transversely spaced apart by a distance slightly greater than the length of the entire sliced loaf and extend forwardly in this relationship parallel to the side margins of the transfer conveyer for a distance approximately equal to the width of one loaf and then converge upwardly toward each other to a point spaced rearwardly from the discharge end of the intermediate conveyer C by a distance approximately equal to the width of a half-loaf and then extend forwardly again in parallelism with the side margins of the machine, as best seen in Figure 1.

The secondary slicing machine D is provided with a forwardly extending transfer conveyer E, also of the chain-driven flight type and including a delivery table 24 having an idle shaft 25. The drive shaft 14 and the shaft 25 are provided with aligned pairs of sprockets 26, 27, over which are trained drive chains 28, 29, equipped with a plurality of spaced flight bars 30.

The slicing machine D is further provided with a delivery plate 31 extending horizontally forwardly on the discharge side thereof for a distance approximately equal to the width of a bread-loaf and being spaced slightly upwardly from the upper face of the transfer conveyor table 24 in the provision of a gap 32 for permitting the flight rods 30 to move from beneath the table and forwardly into loaf engagement, as best seen in Figure 2.

Operably mounted above the upper face of the transfer conveyer E for transverse adjustment with respect thereto, is a pair of opposed parallel loaf guides 33, and it may be noted in this connection that the lower horizontal margins of the loaf guides 33 should preferably be spaced upwardly from the upper face of the transfer conveyer table 24 by a distance sufficient to allow the flight rods 30 to pass freely therebeneath.

The drive shaft 14 on its extended end is provided with an additional sprocket 34, which is connected by a sprocket chain 35 to a sprocket 36 keyed or pinned to the extended end of a main drive shaft 37 of a wrapping machine F, whereby the entire conveying and feeding mechanism of the slicing machines A and D are driven synchronously with the wrapping machine F, as best seen in Figure 1.

The wrapping machine F is further provided with an outwardly extending conveyer G having a plurality of chain-driven pockets g actuated in step motion by a Geneva drive or other suitable mechanism (not shown). The wrapping machine conveyer G is so adjusted that during each interval of motion a pair of the pockets g will be moved forwardly and brought to rest in alignment with the guide members 33 for receiving a loaf fraction as it is discharged from the transfer conveyer E, substantially as shown in Figure 1.

Figure 8:
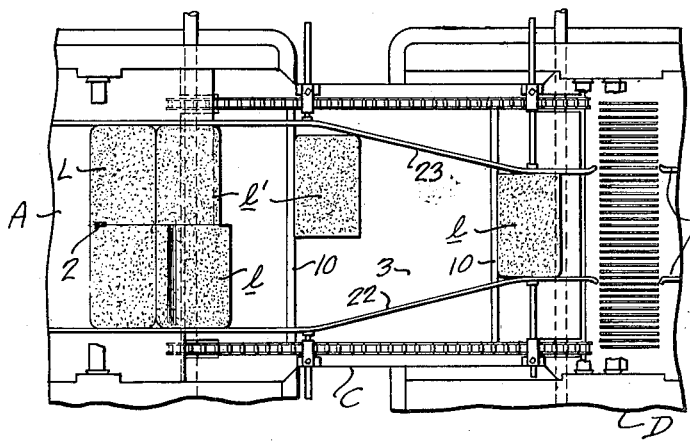
Figure 9:
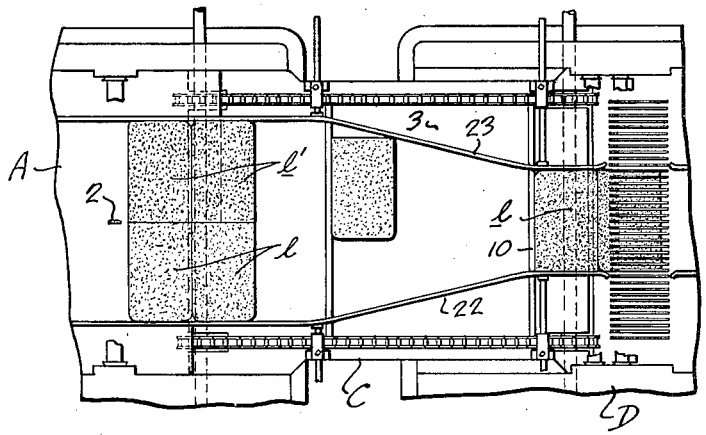

In operation, the bread-loaves L are fed continuously through the primary slicing machine A, wherein they are sub-divided into two unsliced fractions l, l'. As the loaf fractions l, l', move forwardly under the influence of the successive progressing bread-loaves, the section l will drop downwardly over the forward edge of the delivery plate 15 upon the upper face of the intermediate conveyer table 3 in front of one of the flight rods 10 and be progressed forwardly at an accelerated rate of speed, as shown in Figure 7. The other loaf fraction l', however, passes forwardly over the extended portion or projecting step 16 and is held upwardly off of the table 3 until the loaf fraction l and the flight rod 10 have passed forwardly. As the fraction l is progressed forwardly over the table 3, the fraction l' will drop down upon the table 3 in position to be progressed forwardly by the next succeeding flight rod 10. Meanwhile the loaf fraction l is being directed inwardly toward the center line of the table by means of the inclined portion of the side guide member 22 and is brought into entering position with respect to the slicing knives of the slicing machine D, as shown in Figure 8. The other loaf fraction l' will be brought up from behind into contiguous contact with the rearwardly presented face of the loaf fraction l and force it through the slicing knives after the particular flight rod 10, which progressed the fraction l, has moved downwardly beneath the table 3, as shown in Figure 9.

The loaf fractions l, l', will progress forwardly through the slicing knives over the delivery plate 31 between the loaf guides 33 and drop in front of the flight rods 30 in substantially conventional manner. The flight rods 30 are again driven at a more rapid rate of speed, so that as each loaf fraction is picked up thereby, it will be progressed forwardly over the table 24 of the transfer conveyer E at an accelerated rate of speed for introducing some free space between the fractions which will provide a sufficient interval of time for the pockets g of the wrapping machine conveyer G to move forwardly one position and come to rest.

It will, of course, be evident that, if desired, I may provide the primary slicing machine A with a plurality of suitably spaced knives whereby to sub-divide the bread-loaf into a greater number of fractions, such as thirds or quarters, for instance, in which case it would be necessary to provide a delivery plate or other fractionating mechanism adapted to accommodate such larger number of fractions, as is more specifically pointed out and discussed in my co-pending applications, Serial No. 242,430 and Serial No. 242,433, both filed November 25, 1938.

It should be understood that changes and modifications in the form, construction, arrangement, and combination of the several parts of the machine may be made and substituted for those herein shown and described without departing from the nature and principle of my invention.

Having thus described my invention, what I claim and desire to secure by Letters Patent is—

1. A bread-loaf fractionating and slicing machine comprising, in combination, first means for dividing the loaf into a plurality of fractions, second means for sub-dividing the respective loaf-fractions into a plurality of slices, a plate positioned on the discharge side of the first means for receiving the loaf-fractions, means including a conveyer operatively mounted for movement beneath said plate and to the intake side of the second means, and means operatively associated with said plate for successively depositing the separate fractions of the loaf for movement by the conveyer at successive intervals.

2. A bread-loaf fractionating and slicing machine comprising, in combination, first means for dividing the loaf into a plurality of fractions, second means for sub-dividing the respective loaf-fractions into a plurality of slices, a plate positioned on the discharge side of the first means for receiving the loaf-fractions, means including a conveyer operatively mounted for movement beneath said plate and to the intake side of the second means, said plate being provided with a plurality of projecting steps each for supporting engagement respectively with one of the loaf fractions for regulating delivery thereof to the conveyer.

3. A bread-loaf fractionating and slicing machine, comprising, in combination, first means for dividing the loaf into a plurality of fractions, second means for sub-dividing the respective loaf-fractions into a plurality of slices, a plate positioned on the discharge side of the first means for receiving the loaf-fractions, means including a conveyer operatively mounted for movement beneath said plate and to the intake side of the second means, means operatively associated with said plate for successively depositing the separate fractions of the loaf for movement by the conveyer at successive intervals, and means including a pair of guide rails for directing each loaf-fraction from its position of discharge adjacent the dividing means to a common position of intake adjacent the sub-dividing means.

4. A bread-loaf fractionating and slicing machine comprising, in combination, first means for dividing the loaf into a plurality of fractions, second means for sub-dividing the respective loaf-fractions into a plurality of slices, a plate positioned on the discharge side of the first means for receiving the loaf-fractions, means including a conveyer operatively mounted for movement beneath said plate and to the intake side of the second means, means operatively associated with said plate for successively depositing the separate fractions of the loaf for movement by the conveyer at successive intervals, and means including a pair of guide rails operatively mounted intermediate said first and second means for directing the movement of said fractions in consecutive alignment one behind the other to said second means, said rails being intermediate their ends bent inwardly toward each other so that the distance between said guide rails adjacent the discharge side of the first slicing machine is substantially equivalent to the length of a full unfractionated loaf and the distance between said guide rails adjacent the intake side of the second slicing means is substantially equal to the length of a single loaf-fraction.

5. A bread-loaf fractionating and slicing machine comprising, in combination, first means for dividing a bread-loaf into a plurality of fractions, second means spaced from the first means for sub-dividing the respective loaf-fractions into a plurality of slices, first means for progressing a succession of bread-loaves along a path at right angles to the longitudinal axis of the respective loaves for subjection of the successive loaves to said first means for division, and means for subsequently progressing the loaf fractions along first a straight and afterwards an angular continuation of said path for subjection of the successive fractions to said second means for sub-division.

6. A bread-loaf fractionating and slicing machine comprising, in combination, first means for dividing a bread-loaf into a plurality of fractions, second means spaced from the first means for sub-dividing the respective loaf-fractions into a plurality of slices, means for progressing the bread-loaf and its fractions for subjection of the loaf to said first means and its fractions successively to said second means for division and sub-division, respectively, and means for first shifting the divisions into axially spaced relation and then aligning the divisions of said loaf in spaced parallel registration one behind the other prior to delivery to said second means.

7. A bread-loaf fractionating and slicing machine comprising, in combination, first means for dividing a bread-loaf into a plurality of fractions, second means spaced from the first means for sub-dividing the respective loaf-fractions into a plurality of slices, means for progressing the bread-loaf and its fractions for subjection of the loaf to said first means and its fractions successively to said second means for division and sub-division, respectively, and means for shifting the progressed fractions of the loaf into spaced parallel relation with their respective end faces in the same planes for subjection in consecutive order one behind the other to said second means for sub-division.

8. A bread-loaf fractionating and slicing machine comprising, in combination, means for dividing a bread-loaf into a plurality of fractions, second means spaced from the first means for sub-dividing the respective loaf-fractions into a plurality of slices, means for progressing the loaf and its fractions for subjection of the loaf to said first means and its fractions successively to said second means for division and sub-division, respectively, and means including spaced angularly opposed guides for angularly shifting the progressed fractions of the loaf for subjection in consecutive order one behind the other to said second means for sub-division.

9. A bread-loaf fractionating and slicing machine comprising, in combination, first means for dividing a bread-loaf into a plurality of fractions, second means spaced from the first means for sub-dividing the respective loaf-fractions into a plurality of slices, means including spaced parallel conveyers for progressing the bread-loaf and its fractions for subjection of the loaf to said first means and its fractions successively to said second means for division and sub-division, respectively, and means for initially shifting the progressing fractions into axially spaced non-aligned relation and then shifting the progressing fractions of the loaf axially toward a common path for subjection in consecutive order one behind the other to said second means for sub-division.

10. A bread-loaf fractionating machine comprising, in combination, first means for dividing a bread-loaf into a plurality of fractions, second means spaced from the first means for sub-dividing the respective loaf-fractions into a plurality of slices, means including a conveyer for progressing the loaf-fractions for subjection successively to said second means for sub-division, and means including spaced angularly opposed guides for obliquely shifting the progressing fractions of the loaf for subjection in consecutive order one behind the other to said second means for sub-division.

11. A bread-loaf fractionating and slicing machine comprising, in combination, means for dividing a bread-loaf into a plurality of fractions, means for sub-dividing the respective loaf-fractions into a plurality of slices, means including a conveyer table and spaced chain-driven flight rods arranged transversely to the path of travel of the loaves for separately progressing the several fractions to said sub-dividing means, and means for shifting each fraction axially along the flight rod during progression for delivery in 12. A bread-loaf fractionating and slicing machine comprising, in combination, means for dividing a bread-loaf into a plurality of fractions, means for sub-dividing the respective loaf-fractions into a plurality of slices, means including a conveyer for progressing the several fractions to said sub-dividing means, and means including a lipped plate for delivering said fractions successively to the conveyer for delivery in consecutive order one behind the other to said sub-dividing means.

13. A bread-loaf fractionating and slicing machine comprising, in combination, first means for dividing the loaf into a plurality of fractions, second means spaced from the first means for sub-dividing the respective loaf fractions into a plurality of slices, and means for separately shifting the several fractions of the loaf from their respective positions on the discharge side of the first dividing means through paths merging into a single predetermined path on the intake side of the sub-dividing means in a successively spaced consecutive series.

14. A bread-loaf fractionating and slicing machine comprising, in combination, first means for dividing the loaf into a plurality of fractions, second means for sub-dividing the respective loaf fractions into a plurality of slices, a plate positioned on the discharge side of the first means for receiving the loaf fractions, means including a flight-rod conveyer operatively mounted for movement beneath said plate and to the intake side of the second means, and means operatively associated with said plate for delaying a selected fraction of the loaf and depositing such delayed fraction for movement by the conveyer in spaced relationship to the remainder of the loaf.

15. A bread-loaf fractionating and slicing machine comprising means for progressing a succession of bread-loaves along a straight path at right angles to the longitudinal axis of the loaves, cutting means for dividing each loaf into a plurality of fractions during movement along said path, slicing means for subdividing the loaf fractions into a plurality of slices during further movement along said path, means for progressing the loaf fractions from the cutting means to the slicing means along a continuation of said path, and means for axially translating the fractions during movement between the cutting and slicing means for alignment with the second slicing means.

16. A bread-loaf fractionating and slicing machine comprising first slicing means for dividing the loaf into a plurality of fractions, second slicing means positioned in spaced parallel relation to the first slicing means for subdividing the loaf fractions into a plurality of fractions, and means for shifting a loaf fraction from any one of several positions of the first slicing means to a selected position with respect to the second slicing means.

17. A bread-loaf fractionating and slicing machine comprising first slicing means for dividing the loaf into a plurality of fractions, second slicing means for subdividing the loaf fractions into a plurality of slices, and means for separately shifting the several fractions of each loaf from their respective positions on the discharge side of the first slicing means to a single selected position on the intake side of the second slicing means.

GUSTAV C. PAPENDICK.